UNITED STATES PATENT OFFICE.

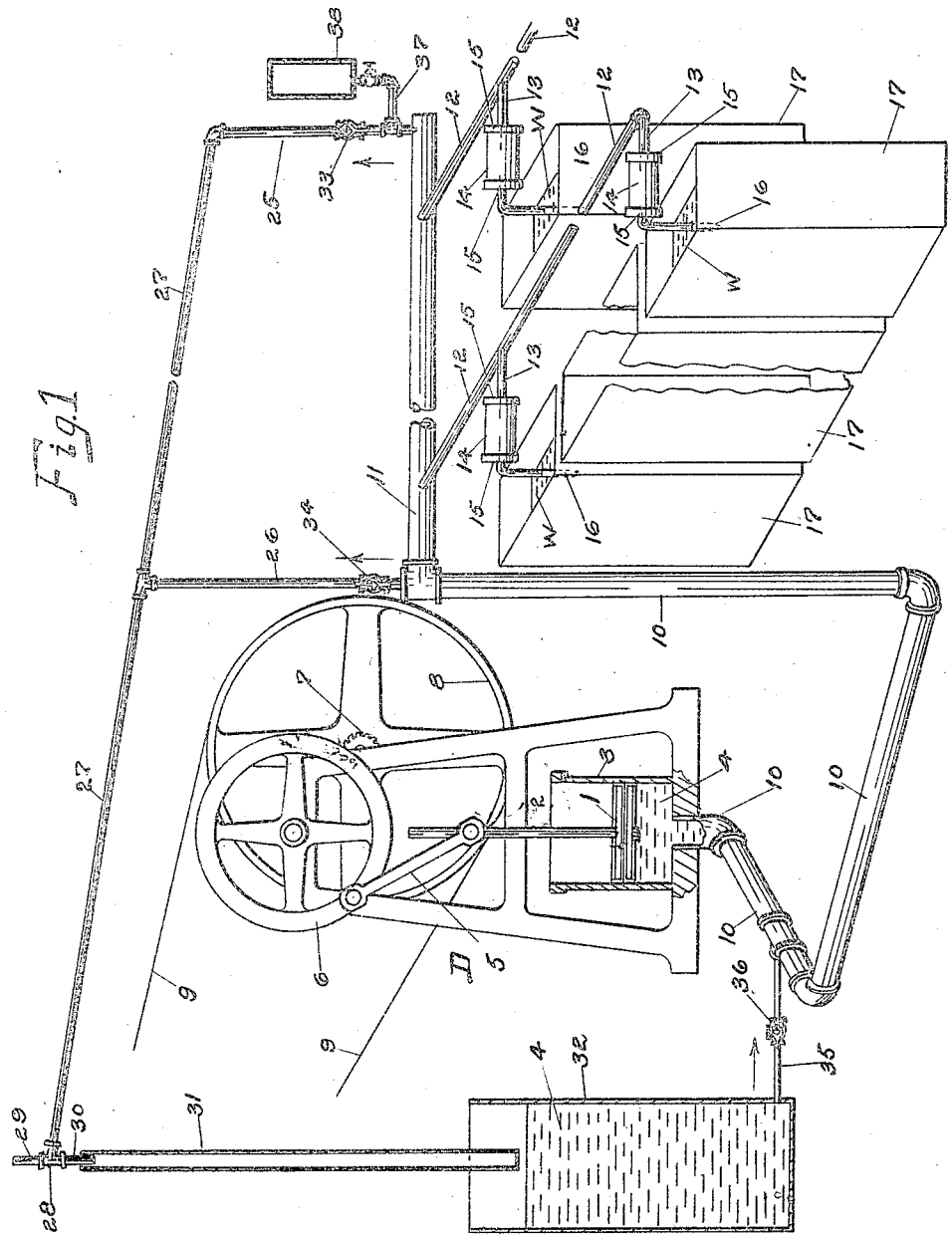

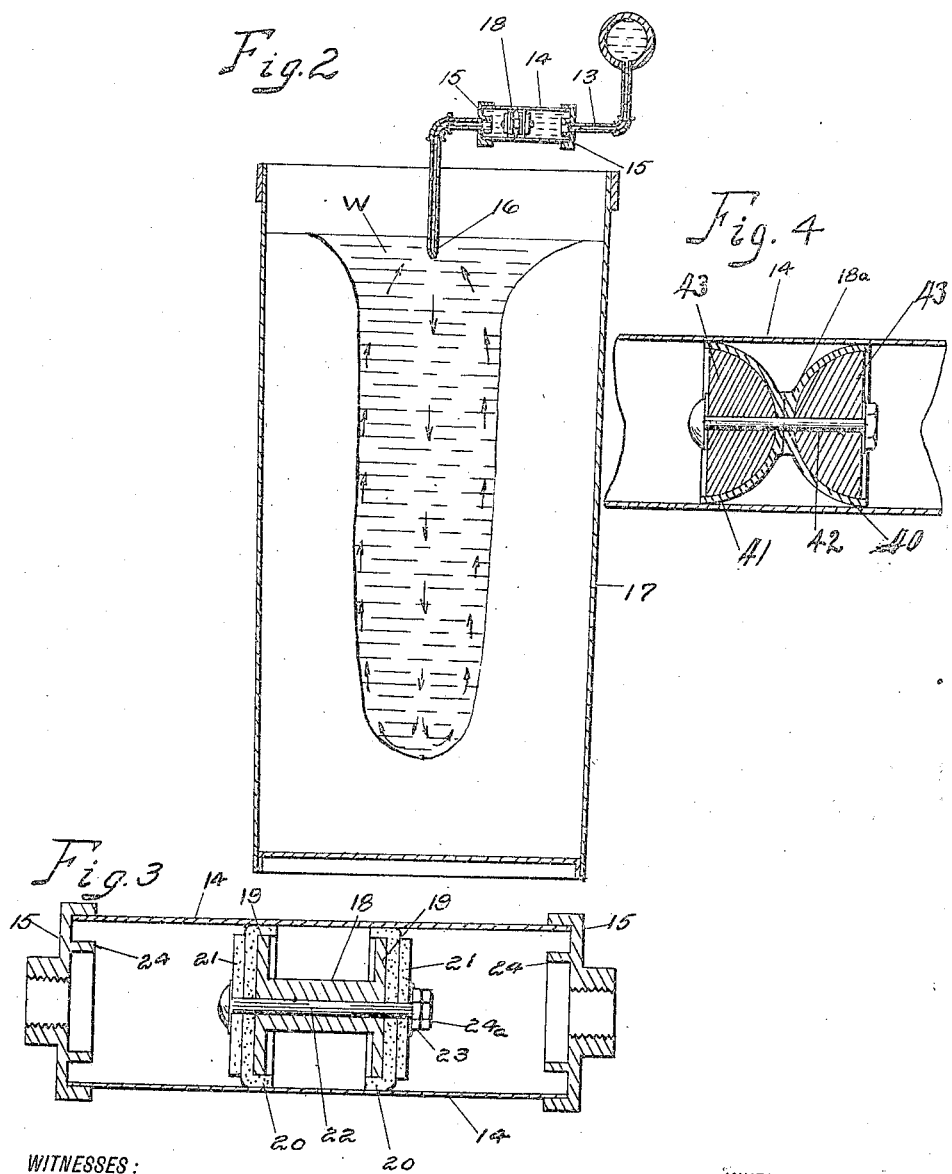

GEORGE L. REUSCHLINE, OF PHILADELPHIA, PENNSYLVANIA.

ICE-MAKING APPARATUS.

1,134,420.

Specification of Letters Patent.

Patented Apr. 6, 1915.

Application filed November 8, 1913. Serial No. 799,844.

*To all whom it may concern:*

Be it known that I, GEORGE L. REUSCH-LINE, a citizen of the United States, residing in Philadelphia, county of Philadelphia, and State of Pennsylvania, have invented new and useful Improvements in Ice-Making Apparatus, of which the following is a specification.

My invention relates to the manufacture of ice, and particularly to a system or apparatus whereby there is produced ice which is clear, that is, ice which is free from cloudiness, milkiness or the like, occasioned by air or other substance held entrained.

By my invention I agitate the water to be frozen by drawing from the vessel containing the same and re-injecting into it a part of the water to be frozen. This I accomplish by means of the system or apparatus hereinafter described, which I believe to be novel in that I employ as the water agitating means a pulsometer comprising a cylinder in which moves a piston which is free, that is, not connected to any external operating means, and which is hydraulically operated by a pump like device, the space on one side of the piston communicating with said pump like device while the space on the other side is connected with the mass of water to be frozen. By this means a plurality of masses of water to be frozen may be simultaneously agitated by a plurality of pulsometers without any path of communication from one mass of water to another; and by this arrangement, where a free piston is introduced in a reciprocating column of liquid or water there is no leakage through the pulsometer from the mass of water to be frozen, because of the presence of water or liquid at all times on both sides of the piston. And it is a part of my invention to provide a system for operating the pulsometers wherein variations from equality between the volume of the motive liquid pumped and the volume swept through by the pulsometer pistons are compensated for or automatically taken care of; and wherein air or other gas entrained in or carried by the motive liquid is extracted from or allowed to escape from the motive liquid; and wherein the head under which the motive liquid operates to eject the water to be frozen from the pulsometers may be made such as to be equal to, greater than or less than the suction head operative when the pulsometers draw in the water to be frozen.

My invention resides in the features above referred to and in other features of construction and combination hereinafter described and claimed.

For an illustration of one of the forms my invention may take reference is to be had to the accompanying drawings, in which:

Figure 1 is a general view, some parts in elevation and some in section, and some in perspective, illustrating a form my apparatus or system may take. Fig. 2 is a vertical sectional view through a can containing water part of which has been frozen together with a sectional view of a pulsometer and its connections. Fig. 3 is a longitudinal sectional view, on larger scale, through one form of pulsometer which may be used. Fig. 4 is a fragmentary longitudinal sectional view through a pulsometer cylinder, showing therein a modified form of free or floating piston.

Referring to the drawings, D is the pumping device comprising the piston or plunger 1 mounted upon the piston rod 2 and movable thereby within the cylinder 3 in which is the motive fluid or liquid 4, such as water, oil or other suitable medium. The piston rod 2 is actuated by the connecting rod 5 connected to the wheel or crank 6 which is driven by any suitable means, such, for example, as a pinion 7 driven by the wheel 8 which is driven by the belt 9 from any suitable source of power as a steam engine, electric motor or other suitable device. Communicating with the interior of the cylinder 3 at its bottom is the pipe 10 which communicates with the pipe or header 11 with which communicate the manifolds or pipes 12 with which communicate the pipes 13 communicating with the interior of the pulsometers 14. The pulsometer cylinders 14 are provided with the cylinder heads 15. Each pipe 13 communicates with a pulsometer cylinder 14 through one of its heads 15 while its other head 15 connects with the nozzle 16 projecting to suitable extent into the raw, distilled or other water W, to be frozen, and disposed in the cans or tanks 17. Within each pulsometer cylinder 14 is a free piston 18. In the form here illustrated, by way of example, this piston 18 has two heads or pistons proper 19, 19 disposed at a distance from each other in order that the piston shall move within the cylinder 14 without binding or cramping. Each of the piston heads 19 is provided with the leather or other washer or gasket 20 for securing a tight running fit with the interior walls of the cylinder. These members 20 are held against the member 19 by the washers 21 drawn toward each other by the bolt 22 on which are engaged the threaded nut 23 and the lock nut 24ª. These washers 21 may be of any suitable material, either metallic, leather or otherwise, whereby at the end of each stroke of the free piston the washer 21 will snugly engage and tightly close the aperture within the annular rib or flange or valve seat 24 surrounding the connection to the pipe 13 and nozzle 16. As indicated the pulsometers are preferably disposed above or near the top of the cans 17.

From the pipe or header 11, which may preferably incline downwardly from its connection with the pipe 10, extend the pipes 25 and 26. (of which 25 may be omitted when head 11 is so inclined) in communication with the pipe 27 which is preferably inclined upwardly, as shown in Fig. 1, terminating at 28 in a part 29 extending upwardly and open to the air and the part 30 extending downwardly and open to the air and communicating with the interior of a pipe 31 which leads to the tank 32. Or the pipe 31 may be omitted entirely; or the pipe 30 may itself extend down to the tank 32 to deliver into it motive fluid under conditions hereinafter named.

In the pipe 25 is a check valve 33 which is adapted to open upwardly only, that is, in a direction to allow flow upwardly through pipe 25. And in pipe 26 is a similar check valve 34 allowing flow through it upwardly only through pipe 26.

Communicating with the tank 32 is a pipe 35 connecting with the pipe 10 at or near one of the lower levels of the piping system for the motive fluid. In the pipe 35 is disposed a check valve 36 which allows passage through it in one direction only motive fluid 4 to the pipe 10.

Communicating with the piping system for the motive fluid at any suitable point, preferably at or near one of its higher levels, as leader 11, is a pipe 37 communicating with the interior of the air cushion chamber 38 which is closed to the atmosphere and of suitable volume for absorbing shocks in the piping system.

Referring to Fig. 4, a fragmentary pulsometer cylinder 14 is shown in longitudinal section and within it a free or floating piston 18ª comprising the preferably cup shaped members 40 and 41 of rubber, leather or any other suitable and preferably flexible material. These cup shaped members are held together by a bolt or other suitable means 42, or the bolt 42 may be omitted and the members 40 and 41 made integral with each other. Each of the members 40 and 41 is provided with a central boss or raised portion 43 adapted to engage and snugly close the valve seats 24 to prevent all possibility of leakage, as hereinbefore described.

The operation of the apparatus or system is as follows: The plunger or piston 1 is moved upwardly and downwardly in successive cycles within the cylinder 3 by any suitable means, for example such as described. In the down stroke the motive fluid 4 is pushed out of the cylinder 3 through the pipe 10 to the header or pipe 11 thence through the manifolds 12 and the connections 13 to one side of the piston 18 in each of the pulsometers. This, as viewed in Fig. 2, causes the free or floating piston 18 to move toward the left and forces out ahead of it through the nozzle 16 a portion of the water to be frozen. This water is ejected with considerable force and causes a circulation, agitation or movement of the water W, as indicated, by way of example, by the series of arrows, Fig. 2. The pulsometer pistons preferably travel until the end of the cylinder is reached when a plate or washer 21 engages the annular valve seat 24 and closes communication between the interior of the cylinder 14 and the nozzle 16, thus preventing passage of any motive liquid 4 into the water W, should there be any leakage around piston 18. At or near this time, the plunger or piston 1 in the cylinder 3 starts on its return or upward movement and draws up into the cylinder 3 the motive fluid 4 causing a suction on the right hand side of the piston 18, Fig. 2, and the atmospheric pressure exerted on the top surface of the water W in can 17 forces a portion of the water up from the nozzle 16 into the cylinder 14 to the left of the piston 18. As the upward movement of the plunger 1 continues the piston 18 of each pulsometer moves toward the right preferably until the right hand washer 21 engages and closes the annular valve 24, thus preventing any water W escaping into the liquid 4, should there be any leakage around piston 18. At or near this time the plunger 1 again starts descending and the piston 18 of each pulsometer moves toward the left ejecting the water into the can. This cycle of operations is continued throughout the freezing of the water W, which, due to the agitation produced, freezes as clear and crystal ice without the formation of milky or cloudy portions.

If the volume swept through by the piston 1 is less than the sum of the volumes swept through by the pulsometer pistons 18 the pulsometer pistons 18 may not travel the entire length of their cylinders. If the volumes referred to are equal however the pistons 18 of the pulsometers will travel the entire length of their cylinders; and the same is true if the volume swept through by the piston 1 is larger than the piston displacements of the cylinders 14. But in such case motive fluid 4 will pass up through either of valves 33 or 34, or both of them, and through pipes 27, 30 and 31 to the tank 32. And at each upward stroke of the plunger 1, depending upon the head of liquid in the tank 32 and the tension of the valve 36 some motive fluid will return into the pipe 10 to make up for any decrease of volume of motive fluid in the piping system as by leakage or other causes to take the place of any air which will also escape through the valves 33 or 34 or both of them, into the pipe 27 and to the outer air through pipes 29 or 30.

And in the chamber 38 is maintained a mass of air which, under compression, acts as a cushion or shock absorber for the shocks which would otherwise be delivered to the piping system by the motive fluid 4.

What I claim is:

1. In apparatus for the manufacture of ice, the combination with a piping system containing fluid, of means for alternately withdrawing fluid from and re-injecting it into said system, a cylinder, a floating piston therein, a connection from one side of said piston to said piping system, a container for water to be frozen, a connection from the other side of said piston extending into said container, an overflow piping system, and a connection therefrom to said first named piping system.

2. In apparatus for the manufacture of ice, the combination with a piping system containing fluid, of means for alternately withdrawing fluid from and re-injecting it into said system, a cylinder, a floating piston therein, a connection from one side of said piston to said piping system, a container for water to be frozen, a connection from the other side of said piston extending into said container, an overflow piping system, a connection therefrom to said first named piping system, and a valve in said connection preventing return flow into said first named piping system.

3. In apparatus for the manufacture of ice, the combination with a piping system containing fluid, of means for alternately withdrawing fluid from and re-injecting it into said system, a cylinder, a floating piston therein, a connection from one side of said piston to said piping system, a container for water to be frozen, a connection from the other side of said piston extending into said container, an overflow piping system, and a connection therefrom to said first named piping system, said overflow piping system being disposed at an altitude higher than said first named piping system.

4. In apparatus for the manufacture of ice, the combination with a piping system, of means connected therewith for changing the direction of flow of liquid contained therein, a cylinder, a floating piston therein, a connection from one side of said piston to said piping system, a container for water to be frozen, a connection from the other side of said piston extending into said container, and a cushion chamber connected with said piping system.

5. In apparatus for the manufacture of ice, the combination with a piping system containing fluid, of means for alternately withdrawing fluid from and re-injecting it into said system, a cylinder, a floating piston therein, a connection from one side of said piston to said piping system, a container for water to be frozen, a connection from the other side of said piston extending into said container, an overflow piping system, a connection therefrom to said first named piping system, a supply of fluid, and a connection therefrom into said piping system.

6. In apparatus for the manufacture of ice, the combination with a piping system containing fluid, of means for alternately withdrawing fluid from and re-injecting it into said system, a cylinder, a floating piston therein, a connection from one side of said piston to said piping system, a container for water to be frozen, a connection from the other side of said piston extending into said container, an overflow piping system, a connection therefrom to said first named piping system, a supply of fluid, a connection therefrom into said piping system, and a valve in said connection allowing flow only into said piping system.

7. In apparatus for the manufacture of ice, the combination with a piping system containing fluid, of means for alternately withdrawing fluid from and re-injecting it into said system, a cylinder, a floating piston therein, a connection from one side of said piston to said piping system, a container for water to be frozen, a connection from the other side of said piston extending into said container, an overflow piping system, a connection therefrom to said first named piping system, a receptacle for overflowing fluid, and a connection from said receptacle into said first named piping system.

8. In apparatus for the manufacture of ice, the combination with a piping system containing fluid, of means for alternately withdrawing fluid from and re-injecting it into said system, a cylinder, a floating piston therein, a connection from one side of said piston to said piping system, a container for water to be frozen, a connection from the other side of said piston extending into said container, an overflow piping system, a connection therefrom to said first named piping system, a receptacle for overflowing fluid, a connection from said receptacle into said first named piping system, and a valve in said connection allowing flow of fluid only from said receptacle into said first named piping system.

9. In apparatus for the manufacture of ice, the combination with a piping system containing fluid, means for alternately withdrawing fluid from and re-injecting the same into said piping system, a cylinder, a floating piston therein, a connection from one side of said piston to said piping system, a container for water to be frozen, a connection from the other side of said piston extending into said container, an overflow piping system, a connection from substantially the highest point in said first named piping system to said overflow piping system, and a connection from said first named piping system to said overflow piping system at a distance from said first named connection, said connection from said cylinder to said first named piping system being at a point between said overflow connections.

10. In apparatus for the manufacture of ice, the combination with a piping system containing fluid, means for alternately withdrawing fluid from and re-injecting the same into said piping system, a cylinder, a floating piston therein, a connection from one side of said piston to said piping system, a container for water to be frozen, a connection from the other side of said piston extending into said container, an overflow piping system, a connection from substantially the highest point in said first named piping system to said overflow piping system, a connection from said first named piping system to said overflow piping system at a distance from said first named connection, said connection from said cylinder to said first named piping system being at a point between said overflow connections, and a valve in each of said overflow connections preventing return flow into said first named piping system.

11. In apparatus for the manufacture of ice, the combination with a system of piping containing motive fluid, of means for changing the direction of flow of said motive fluid, a cylinder, a floating piston therein, a connection from one side of said piston to said piping system, a container for water to be frozen, a connection from the other side of said piston extending into said container, a valve seat in said cylinder associated with said last named connection, and a valve member on said piston adapted to engage said valve seat.

12. In apparatus for the manufacture of ice, the combination with a system of piping containing motive fluid, of means for changing the direction of flow of said motive fluid, a cylinder, a floating piston therein, a connection from one side of said piston to said piping system, a container for water to be frozen, a connection from the other side of said piston extending into said container, a valve seat in said cylinder associated with said first named connection, and a valve member on said piston adapted to engage said valve seat.

13. In apparatus for the manufacture of ice, the combination with a system of piping containing motive fluid, of means for changing the direction of flow of said motive fluid, a cylinder, a floating piston therein, a connection from one side of said piston to said piping system, a container for water to be frozen, a connection from the other side of said piston extending into said container, and valve seats in said cylinder associated with said connections and alternately engaged by valve members on said piston.

14. In apparatus for the manufacture of ice, the combination with a piping system containing fluid, means for alternately withdrawing fluid from and re-injecting the same into said piping system, a cylinder, a floating piston therein, a connection from one side of said piston to said piping system, a container for water to be frozen, a connection from the other side of said piston extending into said container, an overflow piping system, a connection from substantially the highest point in said first named piping system to said overflow piping system, and means preventing return flow from said overflow piping system into said first named piping system.

15. In apparatus for the manufacture of ice, the combination with a piping system containing fluid, means for alternately withdrawing fluid from and re-injecting the same into said piping system, a cylinder, a floating piston therein, a connection from one side of said piston to said piping system, a container for water to be frozen, a connection from the other side of said piston extending into said container, an overflow piping system, said first named piping system having an inclined portion, said connection from said cylinder to said piping system being made to said inclined portion.

16. In apparatus for the manufacture of ice, the combination with a piping system containing fluid, means for alternately withdrawing fluid from and re-injecting the same into said piping system, a cylinder, a floating piston therein, a connection from one side of said piston to said piping system, a container for water to be frozen, a connection from the other side of said piston extending into said container, an overflow piping system, said first named piping system having an inclined portion, said connection from said cylinder to said piping system being made to said inclined portion, and a connection from substantially the highest point in said inclined portion of said first named piping system to said overflow piping system.

17. In apparatus for the manufacture of ice, the combination with a piping system containing fluid, means for alternately withdrawing fluid from and re-injecting the same into said piping system, a cylinder, a floating piston therein, a connection from one side of said piston to said piping system, a container for water to be frozen, a connection from the other side of said piston extending into said container, an overflow piping system, said first named piping system having an inclined portion, said connection from said cylinder to said piping system being made to said inclined portion, a connection from substantially the highest point in said inclined portion of said first named piping system to said overflow piping system, and means preventing return flow from said overflow piping system into said first named piping system.

In testimony whereof I have hereunto affixed my signature in the presence of the two subscribing witnesses.

GEORGE L. REUSCHLINE.

Witnesses:
CARL J. JEFFERSON,
NELLIE B. EVANS.